(12) United States Patent
Reyes et al.

(10) Patent No.: US 11,066,749 B2
(45) Date of Patent: Jul. 20, 2021

(54) CORROSION INHIBITION OF HCL TREATMENT FLUIDS WITH ENVIRONMENTALLY COMPATIBLE SOLVENT

(71) Applicant: Halliburton Energy Services, Inc., Houston, TX (US)

(72) Inventors: Enrique Antonio Reyes, Tomball, TX (US); Alyssa Lynn Lablanc, Humble, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/780,488

(22) Filed: Feb. 3, 2020

(65) Prior Publication Data
US 2020/0173034 A1   Jun. 4, 2020

Related U.S. Application Data

(62) Division of application No. 15/570,203, filed as application No. PCT/US2015/032666 on May 27, 2015, now Pat. No. 10,604,850.

(51) Int. Cl.
*C23F 11/04* (2006.01)
*C09K 8/74* (2006.01)
*C09K 8/54* (2006.01)

(52) U.S. Cl.
CPC ............... *C23F 11/04* (2013.01); *C09K 8/54* (2013.01); *C09K 8/74* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 3,077,454 A | 2/1963 | Monroe | |
| 4,101,425 A | 7/1978 | Young | |
| 4,222,886 A | 9/1980 | Connelly | |
| 4,498,997 A | 2/1985 | Walker | |
| 4,705,665 A * | 11/1987 | Malik | C09K 8/74 134/3 |
| 4,737,296 A * | 4/1988 | Watkins | C09K 8/52 166/307 |
| 5,120,471 A | 6/1992 | Jasinski | |
| 5,591,381 A | 1/1997 | Walker | |
| 5,916,484 A | 6/1999 | Brezinski | |
| 8,361,937 B2 | 1/2013 | Cassidy | |
| 8,404,157 B2 | 3/2013 | Cassidy | |
| 2005/0123437 A1 * | 6/2005 | Cassidy | C09K 8/54 422/12 |
| 2007/0010404 A1 | 1/2007 | Welton | |
| 2008/0146464 A1 | 6/2008 | Malwitz | |
| 2010/0087340 A1 | 4/2010 | Cassidy | |

OTHER PUBLICATIONS

SPE 155966, "Acid Corrosion Inhibitors with Improved Environmental Profiles" dated 2012.
SPE 102908, "Meeting the Environmental Challenge: A New Acid Corrosion Inhibitor for the Norwegian Sector of the North Sea" dated 2006.
International Search Report and Written Opinion for PCT/US15/32666 dated Jan. 12, 2016.
USPTO Office Action for U.S. Appl. No. 15/570,203 dated Mar. 21, 2019.
USPTO Office Action for U.S. Appl. No. 15/570,203 dated Jul. 29, 2019.
USPTO Notice of Allowance for U.S. Appl. No. 15/570,203 dated.

* cited by examiner

*Primary Examiner* — John J Figueroa
(74) *Attorney, Agent, or Firm* — Thomas Rooney; C. Tumey Law Group PLLC

(57) ABSTRACT

A method of treating in a subterranean formation including placing a corrosion inhibitor composition into a subterranean formation, where the formation includes an acidic environment having a pH of about 5 or below, where the composition includes: an organic solvent comprising an alcohol with a flash point of at least about 75° C.; a nitrogen containing compound; an aqueous acid solution comprising HCl; and contacting a metal surface with the corrosion inhibitor composition. A corrosion inhibitor composition includes an organic solvent comprising an alcohol with a flash point of at least about 75° C.; a nitrogen containing compound; and an aqueous acid solution comprising HCl.

11 Claims, 1 Drawing Sheet

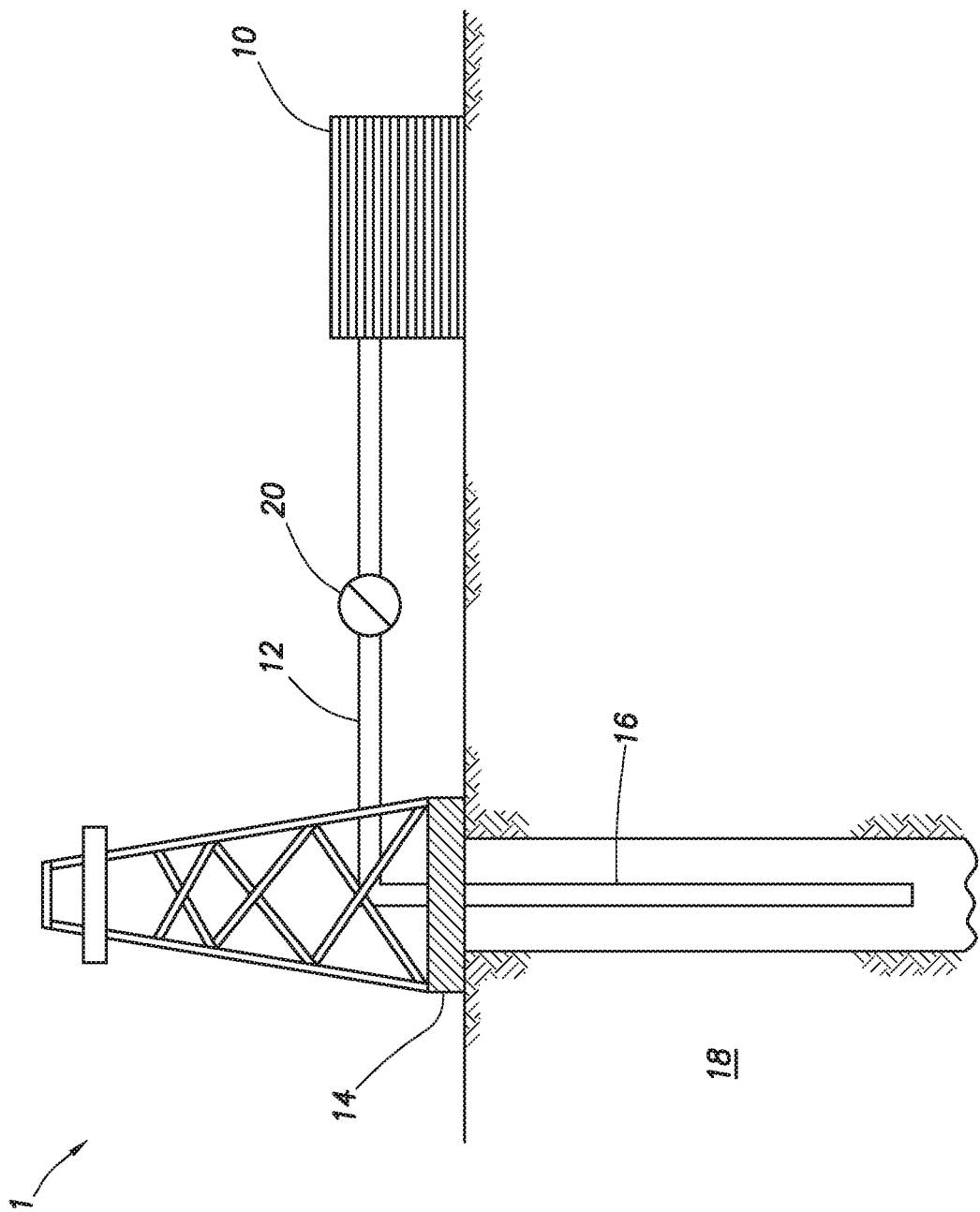

CORROSION INHIBITION OF HCL TREATMENT FLUIDS WITH ENVIRONMENTALLY COMPATIBLE SOLVENT

BACKGROUND

The present invention generally relates to the use of corrosion inhibitor compositions in corrosive environments, such as in subterranean operations, and, more specifically, to corrosion inhibitor compositions comprising organic solvents with a flash point of at least 75° C., and methods of using these compositions in subterranean operations.

The corrosion of metal surfaces occurs when the metal surfaces are contacted by a corrosive environment containing an oxidizer (e.g., an electrochemical oxidizer, a chemical oxidizer or the like). Illustrative corrosive environments include, for example, acidic environments, environments containing water vapor in the presence of air and/or oxygen, and environments containing chloride or bromide ions, carbon dioxide and/or hydrogen sulfide. As used herein, the term "corrosion" refers to any reaction between a material and its environment that causes some deterioration of the material or its properties. Examples of common types of corrosion include, but are not limited to, the rusting of a metal, the dissolution of a metal in acids, and patina development on the surface of a metal.

Acidic environments can be produced by acidic treatment fluids that are commonly used in a number of operations in the oil and gas extractive industries. In such operations, any metal surfaces present are subjected to the corrosive environment of the treatment fluid. For example, metal surfaces (e.g., piping, tubular goods, downhole and surface equipment) can be exposed to acidic treatment fluids in industrial chemical equipment. In subterranean applications, metal surfaces on various types of equipment are often exposed to corrosive conditions during downhole operations. For example, acidic treatment fluids are frequently utilized in the treatment of subterranean formations, and additional corrosive components including brine, carbon dioxide and/or hydrogen sulfide are commonly encountered downhole.

Acidic treatment fluids for downhole use include, for example, acidic clean-up fluids and stimulation fluids. Acidic stimulation fluids include, for example, treatment fluids used in hydraulic fracturing or matrix acidizing treatments. As used herein, the term "treatment fluid" refers to any fluid used in a subterranean application in conjunction with a desired function and/or for a desired purpose. The term "treatment fluid" does not imply any particular action by the fluid or any component thereof. Acidic treatment fluids can include a variety of acids such as, for example, hydrochloric acid, formic acid, hydrofluoric acid, and the like.

While acidic treatment fluids are useful for a variety of downhole operations, they can be somewhat problematic due to potential metal surface corrosion on downhole production tubing and tools, for which the repair or replacement costs are high. Furthermore, under typical downhole conditions, corrosion rates of metal surfaces are frequently increased due to elevated temperatures and pressures that are present in the subterranean environment. In addition to damage caused to downhole metal surfaces, corrosion can result in significant quantities of the acidic treatment fluid containing the corrosion inhibitor composition being introduced into the formation, thereby reducing the treatment fluid's downhole effectiveness at the time of treatment fluid recovery.

To combat potential corrosion problems, various corrosion inhibitors have been used to reduce or substantially prevent corrosion of metal and metal alloy surface on downhole equipment, all with varying levels of success. As used herein, the term "inhibit" and its derivatives refer to a lessening of the tendency of a phenomenon to occur and/or the degree to which that phenomenon occurs. The term "inhibit" does not imply any particular degree or amount of inhibition. Corrosion inhibitor compositions frequently include high vapor pressure organic solvents, specifically methanol, ethanol, n-propanol, or isopropanol, any of which may have health, safety and/or environmental considerations that can geographically limit where they are able to be utilized.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the corrosion inhibitor composition comprising compounds of the embodiments described herein to a downhole location.

DETAILED DESCRIPTION

Embodiments of the invention are directed to corrosion inhibitor formulations for use in oilfield operations that may be in environmentally sensitive locations. The use of high strength (>15%) HCl blends may present problems to the different corrosion inhibitors available for steel alloy grades as a function of temperature, exposure period, and corrosion inhibitor. The interconnectedness of the corrosion phenomenon with the need for high strength HCl is constrained by the ecotoxicity profile of current formulation components. Embodiments of the disclosure pertain to the inclusion of a biodegradable organic solvent, for example tetrahydrofurfuryl alcohol (THFA), in the inhibitor formulation for the purpose of solubilizing active nitrogen containing compounds which can be employed in environmentally sensitive regions. In many embodiments, the organic solvent substitutes high vapor pressure organic solvents, specifically methanol, ethanol, n-propanol, and iso-propanol, which themselves may pose health and safety risks due to their flammability and toxicity characteristics.

In certain embodiments of the present invention, a method comprises: combining an organic solvent and nitrogen containing compound with an aqueous acid solution to form a corrosion inhibitor composition, wherein the organic solvent is an alcohol with a flash point of at least about 75° C., and the aqueous acid solution comprises HCl; and contacting a metal surface with the corrosion inhibitor composition. In some embodiments, the alcohol may comprise tetrahydrofurfuryl alcohol. In other embodiments, the organic solvent may be present in an amount of about 5% to about 100% by weight of the aqueous acid solution. In further embodiments, the nitrogen containing compound may comprise benzylidene aniline or quaternized amino or amide containing reagents of MW less than 1500 g/mol. In exemplary embodiments, the metal surface may comprise a composition selected from the group consisting of carbon-steel which can contain manganese or chromium in amount greater than 0.7 wt %, and typical but not limiting examples of such are N-80, L-80, J-55, P-110, C-95, QT800, QT-900, QT-1000, 5LX-series, HS80, HS-90, and other carbon steel grades; or corrosion resistant alloys (CRA) containing stainless steel and variable chromium content ranging from 1 to 40 wt % such as autenitic, superaustenitic, nitrogen and nickel containing, ferritic, duplex and martensitic. Examples of these are 13Cr-L80, 13Cr-L110, 25Cr alloy, Incoloy 825, 316L, and mixtures thereof. In some embodiments, the aqueous acid solution further comprises acetic acid, formic acid, hydrofluoric acid, and mixtures thereof. In certain embodiments, the temperature of the metal surface is in the range of about 150° F. to about 300° F. In a preferred embodiment, the temperature is at least about 215° F. In an embodiment, the corrosion inhibitor composition may further comprise at least one of potassium iodide, sodium iodide, and combinations thereof. In some embodiments, the corrosion inhibitor composition may further comprise at least one of ethylene glycol, diethylene glycol, propylene glycol, surfactants, and combinations thereof. In an exemplary embodiment, the surfactants may be selected from the group consisting of linear alcohol ethoxylates, amine alcohol ethoxylates, ethoxylated amides, ethoxylated alkyl amines, alkylphenol, alkyoxylated fatty acids, and combinations thereof. Furthermore, scavengers of hydrogen sulfide or oxygen also comprise appropriate additives whose inclusion is determined by the specific reservoir fluid composition.

Some embodiments of the present invention provide a corrosion inhibitor composition comprising: an organic solvent comprising an alcohol with a flash point of at least about 75° C.; a nitrogen containing compound; and an aqueous acid solution comprising HCl. In some embodiments, the alcohol may comprise tetrahydrofurfuryl alcohol. In other embodiments, the organic solvent may be present in an amount of about 5% to about 80% by weight of the aqueous acid solution. In further embodiments, the nitrogen containing compound may comprise benzylidene aniline. In some embodiments, the aqueous acid solution further comprises acetic acid, formic acid, hydrofluoric acid, and mixtures thereof. In an embodiment, the corrosion inhibitor composition may further comprise at least one of potassium iodide, sodium iodide, and combinations thereof. In some embodiments, the corrosion inhibitor composition may further comprise at least one of ethylene glycol, diethylene glycol, propylene glycol, surfactants, and combinations thereof. In an exemplary embodiment, the surfactants may be selected from the group consisting of linear alcohol ethoxylates, amine alcohol ethoxylates, ethoxylated amides, ethoxylated alkyl amines, alkylphenol, alkyoxylated fatty acids, and combinations thereof.

Another embodiment of the invention is directed to a method comprising: placing a corrosion inhibitor composition into a subterranean formation, wherein the formation comprises an acidic environment having a pH of about 5 or below, wherein the composition comprises: an organic solvent comprising an alcohol with a flash point of at least about 75° C.; a nitrogen containing compound; an aqueous acid solution comprising HCl; and contacting a metal surface with the corrosion inhibitor composition. In some embodiments, the alcohol may comprise tetrahydrofurfuryl alcohol. In other embodiments, the organic solvent may be present in an amount of about 5% to about 100% by weight of the aqueous acid solution. In further embodiments, the nitrogen containing compound may comprise benzylidene aniline. In exemplary embodiments, the metal surface may comprise a composition selected from the group consisting of carbon-steel which can contain manganese or chromium in amount greater than 0.7 wt %, and typical but not limiting examples of such are N-80, L-80, J-55, P-110, C-95, QT800, QT-900, QT-1000, 5LX-series, HS80, HS-90, and other carbon steel grades; or corrosion resistant alloys (CRA) containing stainless steel and variable chromium content ranging from 1 to 40 wt % such as autenitic, superaustenitic, nitrogen and nickel containing, ferritic, duplex and martensitic. Examples of these are 13Cr-L80, 13Cr-L110, 25Cr alloy, Incoloy 825, 316L, and mixtures thereof. In some embodiments, the aqueous acid solution further comprises acetic acid, formic acid, hydrofluoric acid, and mixtures thereof. In certain embodiments, the temperature of the metal surface is in the range of about 150° F. to about 300° F. In a preferred embodiment, the temperature is at least about 215° F. In an embodiment, the corrosion inhibitor composition may further comprise at least one of potassium iodide, sodium iodide, and combinations thereof. In some embodiments, the corrosion inhibitor composition may further comprise at least one of ethylene glycol, diethylene glycol, propylene glycol, surfactants, and combinations thereof. In an exemplary embodiment, the surfactants may be selected from the group consisting of linear alcohol ethoxylates, amine alcohol ethoxylates, ethoxylated amides, ethoxylated alkyl amines, alkylphenol, alkyoxylated fatty acids, and combinations thereof.

In an exemplary embodiment, a subterranean formation treatment system comprises: an apparatus, including a mixer and a pump, configured to: place a corrosion inhibitor composition into a subterranean formation, wherein the formation comprises an acidic environment having a pH of about 5 or below, wherein the composition comprises: an organic solvent comprising an alcohol with a flash point of at least about 75° C.; a nitrogen containing compound; an aqueous acid solution comprising HCl; and contact a metal surface with the corrosion inhibitor composition.

In some embodiments, the corrosion inhibitor compositions of the present invention are present in the treatment fluid in an amount ranging from about 0.005% to about 5% by weight of the treatment fluid. In some embodiments, the corrosion inhibitor compositions are present in an amount ranging from about 0.1% to about 2% by weight of the treatment fluid. The amount of the corrosion inhibitor composition used in a treatment fluid can vary depending on conditions present at the metal's surface that is being protected, temperature, contact time, solubility of the corrosion inhibitor composition in the acidic base fluid, the acid strength, the chemical composition of the corrosion inhibitor, and other factors that will be evident to those of ordinary skill in the art having the benefits of this disclosure.

Aqueous Acid Solution

The aqueous acid solutions of the present embodiments can generally be from any source, provided that the fluids do not contain components that might adversely affect the stability and/or performance of the other components of the present invention. An aqueous treatment fluid may be combined with an acid to form the aqueous acid solutions of the invention. In various embodiments, the aqueous treatment fluid can comprise fresh water, salt water, seawater, brine, or an aqueous salt solution. In some embodiments, the aqueous treatment fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

The acids present in the treatment fluids of the present invention can include, but are not limited to, organic acids, mineral acids (e.g., hydrochloric acid, hydrofluoric acid, and the like), and mixtures of these acids. In some embodiments, the acid is hydrochloric acid. Additionally, a variety of weak acids (e.g., organic acids) can be used in accordance with embodiments of the present invention. Illustrative examples of suitable weak acids include, for example, formic acid, acetic acid, citric acid, glycolic acid or hydroxyacetic acid, lactic acid, maleic acid, hydrofluoric acid, 3-hydroxypropionic acid, carbonic acid, glutamic acid N,N-diacetic acid or a salt thereof (GLDA), hydroxyimino disuccinic acid (HIDS) and/or methylglycine N,N-diacetic acid or a salt thereof (MGDA), β-alanine diacetic acid, ethylenediaminedisuccinic acid, iminodisuccinic acid, N-tris [(1,2-dicarboxyethoxy)ethyl]amine, N-bis[2-(carboxymethoxy)ethyl] glycine, N-bis[2-(1,2-dicarboxyethoxy)ethyl]glycine, N-bis [2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof. In various embodiments, the acid is present in the treatment fluid in an amount ranging between about 1% and about 37% by weight of the treatment fluid. In some embodiments, the acid is present in the treatment fluid in an amount ranging between about 5% and about 28% by weight of the treatment fluid. Factors that can dictate the chosen concentration of the acid in the treatment fluid include, for example, the desired purpose or use of the treatment fluid, the identity of the acid used and whether it is a strong or weak acid, the presence or absence of other components in the treatment fluid, and/or additional factors that will be recognized by one of ordinary skill in the art having the benefit of this disclosure.

In practice, corrosion rates generally tend to increase with increasing acid concentration and with increasing temperature. While typically used aldehydes and ketones may provide only limited corrosion protection in 15% hydrochloric acid at temperatures higher than 225° F. and in 28% hydrochloric acid at temperatures higher than 200° F., the corrosion inhibitor compositions of the present invention may significantly improve corrosion inhibition of metal surfaces under the above mentioned conditions. Generally, the corrosion inhibitor compositions of this invention may be effective at hydrochloric acid concentrations of about 28% up to about 350° F., with a preferred range of about 215° F. to about 275° F.

Organic Solvents

The organic solvents of the present may be solvents with a flash point greater than about 75° C. that solubilize active nitrogen containing compounds. In one embodiment the organic solvent is an alcohol with a flash point greater than about 75° C. In an exemplary embodiment, the alcohol is tetrahydrofurfuryl alcohol (THFA). THFA has many advantages over high vapor pressure organic solvents such as MeOH, EtOH, and n-propanol, or iso-propanol. Several advantages and properties include, but are not limited to: Not classified as hazardous waste; listed on TSCA, DSL, ENCS, ECL, PICCS; not on hazardous air pollutant (HAP) list; EINECS Number: 202-625-6; FEMA GRAS listing; direct and indirect food contact listing; not on SARA list; cleared for Ag-use under California Rule 66; low phytotoxicity; water miscible; renewable and commercially available; biodegradable; EPA-approved solvent; not photochemically reactive; high flash (183° F./84° C.); high boiling point; low freezing point (<−80° C.); chemical and thermal stability; and high solvency for organics. Other solvents that have been used to solubilize N-heterocyclic aromatics include DMF (dimethylformamide), DMPU (dimethyl pyrimidinone), DMSO (dimethyl sulfoxide), DMA (dimethylacetamide), NMP (N-methylpyrrolidone), DMAC (dimethyl acetamide), tetrahydrofuran (THF), acetonitrile, acetone, yet these differ from THFA in being polar aprotic solvents.

In some embodiments, the organic solvent may be present in an amount of about 5% to about 100% by weight of the aqueous acid solution. In a preferred embodiment, the amount of organic solvent is about 30% by weight of the aqueous acid solution.

Nitrogen Containing Compounds

The corrosion inhibitor compositions of the present invention comprise nitrogen containing compounds. The nitrogen containing compound may include at least one of: the product of a reaction between at least one aldehyde and at least one amide that is not formamide or a formamide derivative; a quaternary nitrogen containing compound; and combinations thereof.

Aldehydes

In some embodiments, the aldehyde may have a structure selected from

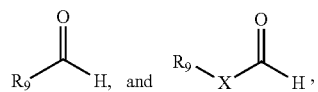

Formulas 1 and 2 where R9 is alkyl, alkenyl, alkynyl, aryl, aralkyl, cycloalkyl, heterocyclyl, heteroaryl or heteroaralkyl and X is $(CH_2)_n$, CH=CH or C≡C, where n is an integer ranging from 1 to about 10. These groups can be straight chain or branched and can also contain heteroatom functionality in the main chain or as a side chain appendage. Heteroatoms include, for example, O, N, S, F, Cl, Br and I.

The aldehydes of the invention may include at least one of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl) methylene]benzeneacetaldehyde, α-(hydroxymethylene)-4-methylbenzylacetaldehyde, 4-chloro-α-(hydroxymethylene) benzeneacetaldehyde, α-nonylidenebenzeneacetaldehyde, 3,7-di methyl-2,6-octadienal, cinnamaloxime, cinnamonitrile, and beta-hydroxy aldehydes which dehydrate to form alpha,beta-unsaturated aldehydes under acidic conditions, glyoxylic acid, glyoxal, and combinations thereof.

Amides

Amides of the invention compositions and methods are not formamide or a formamide derivative. As used herein, the term "formamide or a formamide derivative" refers to formamide, N-substituted formamides and N,N-disubstituted formamides. One of ordinary skill in the art will recognize that formamides and formamide derivatives can liberate formic acid or formaldehyde under certain conditions.

The at least one amide may comprise a primary amide or a secondary amide. In some embodiments, the at least one amide may have a structural formula of

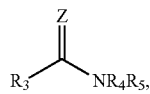

Formula 3 where Z is O or S, $R_3$ is alkyl, trihaloalkyl, alkenyl, alkynyl, aryl, aralkyl, cycloalkyl, heterocyclyl, heteroaryl or heteroaralkyl and $R_4$ and $R_5$ are independently hydrogen, alkyl, alkenyl, alkynyl, aryl, aralkyl, cycloalkyl, heterocyclyl, heteroaryl or heteroaralkyl, provided that at least one of $R_4$ or $R_5$ is H. These groups may be straight chain or branched and may also contain heteroatom functionality in the main chain or as a side chain appendage. Heteroatoms include, for example, O, N, S, F, Cl, Br and I.

The amides may comprise at least one amide selected from the group consisting of acetamide, N-methylacetamide, trichloroacetamide, N-methyltrichloroacetamide, propanamide, N-methylpropanamide, butanamide, N-methylbutanamide, pentanamide, N-methylpentanamide, hexanamide, N-methylhexanamide, benzamide, N-methylbenzamide, 1-naphthylamide, N-methyl-1-naphthylamide, 2-naphthylamide, N-methyl-2-naphthylamide, o-toluamide, N-methyl-o-toluamide, m-toluamide, N-methyl-m-toluamide, p-toluamide, N-methyl-ptoluamide, thiobenzamide, 4-pyridinethioamide, ethionamide, pyrazine-2-thiocarboxamide, nicotinamide, stearamide, 2,2-diethoxyacetamide and lauric acid amide, amides derived from primary or secondary amines, and combinations thereof.

The primary or secondary amines may be selected from the group consisting of ethanolamine, diethanolamine, partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine, tert-benzyl-tert-butylamine, 3,4-diaminofuran, 2,4-diamino-6-phenyl-1,3,5-triazine, 2,4-diamino-6-methyl-1,3,5-triazine, 2,4 diamino-6,-hydroxy-1,3, 5-triazine, 2,4-diamino-6-chloro-1,3,5-triazine, 2,5-diaminotoluene, 2,6-diamino pyridine, 2,6 diaminotoluene, 2,4-diaminotoluene, m-phenylenediamine, p-phenylenediamine, 4-methyl-m-phenylenediamine, 2,5 diaminotoluene sulfate, 2-methyl-1,3-benzenediamine, 5-chloro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyObutanamide, 2,4-diaminobenZenesulfonic acid, 4-ethoxy-1,3-phenylenediamine 2HCl, 2,4-bis(butylamino)-3-oxo-1-cyclobutenylium-1-olate, 2,4-bis(3-benzamidopropylamino) 3-oxo-1-cyclobutenylium-1-olate, 4-imino-5-methyl-2 nitramino-4H-imidazole, 2,5-diacetamido-1,3,4-thiadiazole, 5-amino-1,3,3-trimethylcyclohexanemethylamine and combinations thereof.

Quaternary Nitrogen Containing Compounds

The quaternary nitrogen containing compound may comprise quaternized amino or amide containing compounds of molecular weight less than 1500 g/mol.

In an exemplary embodiment, the quaternary nitrogen containing compound is at least one with the following general structure:

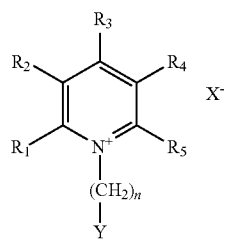

Formula 4 wherein: (i) n is an integer from 1 to 4; (ii) $R_1$, $R_2$, $R_3$, $R_4$, and $R_5$ are each independently selected from H, $-(CO_2H)_w$, $-(CO_2R_6)_x$, $-(C(=O)NR_7R_8)_w$, $-C(=O)NR_7R_8$, $-N(H)C(=O)R_8$, tetrazolyl, substituted tetrazolyl, alkoxy, dialkoxy, alkyl, substituted alkyl, dialkyl, substituted dialkyl, amine, substituted amine, and combinations thereof, wherein $R_6$ is a $C_1$-$C_8$ alkyl or phenyl, $R_7$ is H or a $C_1$-$C_4$ alkyl, $R_3$ is H or a $C_1$-$C_4$ alkyl, W is 1 or 2, and X is 1 or 2; (iii) Y is selected from napthyl, benzyl, anthracyl, phenanthrinyl, substituted napthyl, substituted benzyl, substituted anthracyl, substituted phenanthrinyl, and combinations thereof; and (iv) X⁻ is a counterion with a charge suffcient to balance the positive charge on the parent compound of the general structure; and wherein the composition retains dispersibility in an acidic environment.

Product of the Reaction of an Aldehyde and an Amide

The product of the reaction between at least one aldehyde and at least one amide may comprise a compound with at least one the following structures:

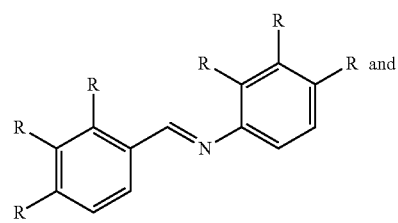

Formula 5

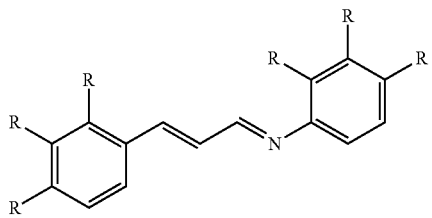

Formula 6 where R is H, methyl, ethyl, hydroxy, methoxy, ethoxy, bromo, chloro, fluoro, mercapto, dimethylamino, diethylamino groups, N-alkyl, N-cycloalkyl and N-alkylarylpyridinium halides, N-cyclohexylpyridinium bromide or chloride, N-alkyl, N-cycloalkyl, N-alkylarylquinolinium halides, N-dodecylquinolinium bromide or chloride, and combinations thereof.

In one embodiment, N-benzylideneaniline is formed by a reaction comprising benzaldehyde and aniline, is readily commercially available with a current CAS Registry Number of 538-51-2, and has the following structure:

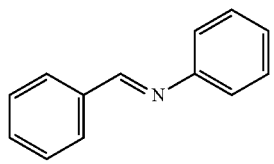

Formula 7

In other embodiments, the reaction product is a cinnamylidene aniline compound.

Co-Solvents

In some embodiments, the aqueous acid fluid can further comprise a co-solvent that is miscible with the aqueous acid fluid. Addition of a co-solvent to the aqueous acid fluid can aid incorporation of the corrosion inhibitor composition therein. Generally, the co-solvent is a water-miscible organic solvent such as, for example, glycols (e.g., ethylene glycol and propylene glycol) and glycol ethers (e.g., ethylene glycol monomethyl ether, ethylene glycol dimethyl ether, ethylene glycol monoethyl ether, ethylene glycol diethyl ether, and ethylene glycol monobutyl ether) or the like, and mixtures thereof.

Surfactants

As also mentioned, the corrosion inhibitor compositions of this invention may also include a surfactant for dispersing the N-hetercyclic compound in a corrosive aqueous fluid. Examples of suitable such dispersing surfactants are alkyoxylated fatty acids, alkylphenol alkoxylates, ethoxylated amides and ethoxylated alkyl amines. Also suitable are EO/PO block copolymer surfactants. In an exemplary embodiment, when a dispersing surfactant of the type described above is utilized in a corrosion inhibitor composition of this invention, it is generally present in the composition in an amount in the range of from about 1% to about 45% by weight of the composition.

Metals

The metals that can be protected from corrosion by the corrosion inhibiting methods and compositions of this invention include, but are not limited carbon-steel which can contain manganese or chromium in amount greater than 0.7 wt %, and typical but not limiting examples of such are N-80, L-80, J-55, P-110, C-95, QT800, QT-900, QT-1000, 5LX-series, HS80, HS-90, and other carbon steel grades; or corrosion resistant alloys (CRA) containing stainless steel and variable chromium content ranging from 1 to 40 wt % such as autenitic, superaustenitic, nitrogen and nickel containing, ferritic, duplex and martensitic. Examples of these are 13Cr-L80, 13Cr-L110, 25Cr alloy, Incoloy 825, 316L, and mixtures thereof.

Other Additives

In some embodiments, treatment fluids of the present invention may further comprise additional components commonly used in treatment fluids and/or corrosion inhibitors.

In some embodiments, an aqueous phase base fluid of the present treatment fluids can be emulsified with a non-aqueous fluid. The emulsion can be of the oil-in-water type or water-in-oil type. In some embodiments, the aqueous phase base fluid can be viscosified with an acid stable gelling agent, such as, for example, a polymer and an optional crosslinking agent. In some embodiments, the aqueous phase base fluid can be foamed. In some embodiments, additional components such as, for example, surfactants can be added to the aqueous phase base fluid. The treatment fluids of the present invention optionally can further include additives such as, for example, salts, scale inhibitors, organic corrosion inhibitors, catalysts, clay stabilizers, friction reducers, gases, foaming agents, iron control agents, solubilizers, pH adjusting agents (e.g., buffers), and the like. Combinations of these additives can be used as well. Those of ordinary skill in the art, with the benefit of this disclosure, will be able to determine the appropriate additives for a particular application and the benefits and advantages thereof.

Intensifiers

In some embodiments, the corrosion inhibitor composition may also include an iodide source such as potassium iodide, sodium iodide, and iodine. These iodine compounds may act as a corrosion inhibitor intensifier. Additional intensifiers may include cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. When a corrosion inhibitor activator is included in a composition of this invention, it is generally present in an amount in the range of from about 0.1% to about 5.0% by weight of the composition.

The treatment fluids of the present invention may be prepared by any method suitable for a given application. For example, certain components of the treatment fluid of the present invention may be provided in a pre-blended powder or a dispersion of powder in a nonaqueous liquid, which may be combined with an aqueous base fluid at a subsequent time. After the preblended liquids and the aqueous base fluid have been combined other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a treatment fluid may be used. Subterranean hydrocarbon containing formations penetrated by well bores are often treated with aqueous acids to stimulate the production of hydrocarbons therefrom. One such treatment, generally referred to as "acidizing," involves the introduction of an aqueous acid solution into a subterranean formation under pressure so that the acid solution flows through the pore spaces of the formation. The acid reacts with acid soluble materials contained in the formation thereby increasing the size of the pore spaces, thus increasing, or restituting to a prior state, the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the compositions and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Corrosion Testing Data

The corrosion tests were conducted with samples of N-80, 13Cr-L80 and 13Cr-110. The metal coupons were cleaned with organic solvent (acetone) after bead blasting the surface, and were dried and weighed before each test. The coupons were removed from the reactor after cooling it under running water and washed thoroughly with acetone to remove the organic corrosion inhibitor, and was then dried and weighed. Corrosion testing was conducted in a Hastelloy C (HC) high-pressure/high-temperature (HP/HT) reactor equipped with an internal attachment from which the coupons were suspended using Teflon® tape. For each test, the reactor was pressurized to 1,000 psi with nitrogen gas and heated at a rate of 5° C./min; the temperature was monitored with a J-type HC thermocouple immersed in the fluid. Tables 1 and 2 provide the respective testing parameters and results for N-80 and chrome metallurgical samples exposed to 28% HCl at 250° F. and 200° F.

Corrosion Inhibitor Preparation. "CI" is used to denote corrosion inhibitor blend which contains the same substances and only differs in the solvent (THFA or MeOH) employed to prepare such blend of inhibiting substances. The concentration of the individual substances in the inhibitor blend is provided in weight basis (% wt/v) and such formulations are described below. The blended inhibitor formulation contains NaI or KI in 1.2% w/v as specified in the formulation description below. The amount of blended inhibitor (A or B) used in each test is stipulated on a v/v % basis of the total acid volume and is provided in Table 1; or in the case of the control tests no inhibitor at all (indicated as 0%). All tests conducted in Table 2 were exclusively done with the blended inhibitor formulation containing 1.2% w/v KI. In all cases but the control tests (Test ID 1-R2 and 2-R2) additional KI as intensifier was used in an amount of 0.24% w/v of acid solution.

| CI Blend A Formulation: | CI Blend B Formulation |
|---|---|
| 15% Benzylidene Aniline | 15% Benzylidene Aniline |
| 30% Benzaldehyde | 30% Benzaldehyde |
| 31.6% THFA | 31.6% Methanol |
| 10% Diethylene Glycol | 10% Diethylene Glycol |
| 12.2% Benzamide | 12.2% Benzamide |
| 1.2% Sodium Iodide | 1.2% Sodium Iodide |
| (or Potassium iodide) | (or Potassium iodide) |

TABLE 1

Corrosion data for 28% HCl and N-80 metallurgy at 250° F. for 3-hour exposure period.

| Test ID | CI Blend A (v/v) | CI Blend B (v/v) | Inorganic intensifier (w/v) | lbm/ft$^2$ | Inhibitor formulation prepared with |
|---|---|---|---|---|---|
| 1-R2 | 2% | 0 | 0 | 0.1099 | n/a |
| 2-R2 | 0 | 2% | 0 | 0.1716 | n/a |
| 3-R2 | 2% | 0 | 0.24% | 0.0393 | KI |
| 4-R4 | 0 | 2% | 0.24% | 0.0989 | KI |
| 5-R2 | 2% | 0 | 0.24% | 0.0507 | NaI |
| 6-R4 | 0 | 2% | 0.24% | 0.1217 | NaI |
| 7-R2 | 4% | 0 | 0.24% | 0.0477 | NaI |
| 8-R4 | 0 | 4% | 0.24% | 0.0876 | NaI |

CI Blend A - formulated with THFA
CI Blend B - regular formulation, prepared with MeOH

TABLE 2

Corrosion data for 28% HCl and chrome (13C-L80 and 13Cr-M110) metallurgy for 3 hour exposure period.

| Test ID | Metallurgy | Temp (° F.) | CI Blend A (w/v) | CI Blend B (w/v) | KI (w/v) | lbm/ft$^2$ |
|---|---|---|---|---|---|---|
| 9-R2 | 13Cr-L80 | 200 | 4% | 0 | 0.24% | 0.0106 |
| 10-R4 | 13Cr-L80 | 200 | 0 | 4% | 0.24% | 0.0167 |
| 11-R2A | 13Cr-L80 | 250 | 4% | 0 | 0.24% | 0.0561 |
| 12-R4A | 13Cr-L80 | 250 | 0 | 4% | 0.24% | 0.1279 |
| 13-R2B | 13Cr-110 | 200 | 2% | 0 | 0.24% | 0.0071 |
| 14-R4B | 13Cr-110 | 200 | 0 | 2% | 0.24% | 0.0181 |
| 15-R2 | 13Cr-110 | 250 | 4% | 0 | 0.24% | 0.0059 |
| 16-R4 | 13Cr-110 | 250 | 0 | 4% | 0.24% | 0.0221 |
| 17-R2 | 13Cr-110 | 300 | 4% | 0 | 0.24% | 0.0587 |
| 18-R4 | 13Cr-110 | 300 | 0 | 4% | 0.24% | 0.0613 |
| 19-R2 | 13Cr-110 | 275 | 4% | 0 | 0.24% | 0.0331 |
| 20-R4 | 13Cr-110 | 275 | 0 | 4% | 0.24% | 0.0498 |

Fluid Preparation

All tests were conducted with 28% HCl (w/v) and the corrosion inhibitor blends whose compositions are referred to as corrosion inhibitor A and B. The improved formulation disclosed here is corrosion inhibitor A (CI-A), which eliminates low flash point solvents (methanol, ethanol, isopropanol), and THFA substitutes partially or entirely the organic solvents and/or co-solvents (ethylene glycol, diethylene glycol, propylene glycol). The corrosion inhibitor B (CI-B) contains low flash point solvents (methanol or ethanol, isopropanol) and can include a co-solvent. The composition of the corrosion inhibitor blends CI-A and CA-B contain iodide, which can be in the form or K or Na and such concentrations are provided in w/v. Tests 1-4 and 9-20 were conducted using the corrosion inhibitor blends prepared with KI, while Tests 5-8 were done with the blend prepared with NaI. To each of the respective blends (CI-A or CI-B) a corrosion inhibitor intensifier was included solely in the form of KI, as specified in Table 1. Testing parameters for chrome alloys were carried out in similar fashion and are reported in Table 2.

The test matrix indicates that the regular corrosion inhibitor blend, CI-B, containing a low flash point alcohol, does not adequately prevent corrosion (measured as the rate of mass loss from the metallurgical specimen) of the N-80 coupon when 28% HCl acid is used for a period of 3 hours. In all instances the mass loss exceeds 0.05 lbm/ft$^2$ when using 2% CI-B. Both blends, CI-A and CI-B, contain an inorganic salt intensifier which was included as NaI or KI into the formulation comprising HAI-980. Exclusion of the KI intensifier leads to greater corrosion rate of the specimen while the inclusion of the intensifier (0.24% w/v) lowers the corrosion rate to 0.039 and 0.047 lbm/ft$^2$ exemplified by results obtained in Test 1 and 2, and Test 5 and 6. When NaI is included in the formulation of the modified inhibitor, CI-A, (Test 5) and KI is also included as an inhibitor intensifier, the rate only slightly diminishes yet the mass loss still exceeds acceptable standards. By increasing the concentration of CI-A to 4% v/v, in conjunction with the intensifier KI (0.24% w/v), corrosion mass loss can actually be reduced for the 3-hour period.

The corrosion resistant alloys Cr13-L80 and Cr13-M110 were exposed to the same acid (28% HCl) for 3 hours at 200, 250, 275 and 300° F. The inhibitor formulation was prepared with KI; and Test 9-16 contained KI as additional corrosion inhibitor intensifier as stipulated in Table 2. The THFA-formulated blend provides improved corrosion protection at the 250° F. temperature datum, but at 200° F. there is no discernable difference in performance compared to the methanol-based formulation. While the corrosion mass loss rate at 250° F. exceeds the standard of 0.5 lbm/ft$^2$ (and in some areas actually being lower, 0.03 lbm/ft$^2$), the THFA-formulation provides 44% additional protection compared to the MeOH formulation. The 13Cr-M110 alloy is protected to a greater extent with the THFA formulation, which undergoes a corrosion mass loss rate of 0.0059 lbm/ft$^2$ compared to 0.0221 lbm/ft$^2$ for the methanol-based inhibitor formulation.

Based on the information above, one of skill in the art may determine that the organic solvent and fluids using the solvent disclosed by the invention may be desirable for at least the following reasons: methanol, ethanol, iso-propanol, and n-propanol are not present; the solvent in the invention has a high flash point with respect to the four mention alcohols, thereby negating the risk associated with increased flammability; the fluids of the invention are environmentally compatible, especially when compared to fluids with the four alcohols above; the solvent is commercially; the disclosed solvent has a low vapor pressure allowing it be more easily handled in hot climate regions; the disclosed solvent has a low freeze/pour point, allowing it to be used in cold regions.

Embodiments disclosed herein include:

A: A method comprising: combining an organic solvent with a nitrogen containing compound, wherein the nitrogen containing compound includes at least one of: the product of a reaction between at least one aldehyde and at least one amide that is not formamide or a formamide derivative; a quaternary nitrogen containing compound, and combinations thereof, with an aqueous acid solution to form a corrosion inhibitor composition, wherein the organic solvent is an alcohol with a flash point of at least about 75° C., and the aqueous acid solution comprises HCl; and contacting a metal surface with the corrosion inhibitor composition.

B: A corrosion inhibitor composition comprising: an organic solvent comprising an alcohol with a flash point of at least about 75° C., a nitrogen containing compound, wherein the nitrogen containing compound includes at least one of: the product of a reaction between at least one aldehyde and at least one amide that is not formamide or a formamide derivative; a quaternary nitrogen containing compound; and combinations thereof; and an aqueous acid solution comprising HCl.

C: A method comprising: placing a corrosion inhibitor composition into a subterranean formation, wherein the formation comprises an acidic environment having a pH of about 5 or below, wherein the composition comprises: an organic solvent comprising an alcohol with a flash point of at least about 75° C.; a nitrogen containing compound, wherein the nitrogen containing compound includes at least one of: the product of a reaction between at least one aldehyde and at least one amide that is not formamide or a formamide derivative; a quaternary nitrogen containing compound; and combinations thereof, and an aqueous acid solution comprising HCl; and contacting a metal surface with the corrosion inhibitor composition.

D: A subterranean formation treatment system comprising: an apparatus, including a mixer and a pump, configured to: place a corrosion inhibitor composition into a subterranean formation, wherein the formation comprises an acidic environment having a pH of about 5 or below, wherein the composition comprises: an organic solvent comprising an alcohol with a flash point of at least about 75° C.; a nitrogen containing compound, wherein the nitrogen containing compound includes at least one of: the product of a reaction between at least one aldehyde and at least one amide that is not formamide or a formamide derivative; a quaternary nitrogen containing compound; and combinations thereof, and an aqueous acid solution comprising HCl; and contact a metal surface with the corrosion inhibitor composition.

Each of embodiments A, B, C and D may have one or more of the following additional elements in any combination: Element 1: wherein the alcohol comprises tetrahydrofurfuryl alcohol (THFA). Element 2: wherein the organic solvent is present in an amount of about 5% to about 100% by weight of the aqueous acid solution. Element 3: wherein the at least one aldehyde comprises at least one aldehyde selected from the group consisting of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N di methylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-αpentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, 3,7-dimethyl-2,6-octadienal, cinnamaloxime, cinnamonitrile, and beta-hydroxy aldehydes which dehydrate to form alpha,beta-unsaturated aldehydes under acidic conditions, glyoxylic acid, glyoxal, and combinations thereof.

Element 4: wherein the at least one amide comprises at least one amide selected from the group consisting of acetamide, N-methylacetamide, trichloroacetamide, N-methyltrichloroacetamide, propanamide, N-methylpropanamide, butanamide, N-methylbutanamide, pentanamide, N-methylpentanamide, hexanamide, N-methylhexanamide, benzamide, N-methylbenzamide, 1-naphthylamide, N-methyl-1-naphthylamide, 2-naphthylamide, N-methyl-2-naphthylamide, o-toluamide, N-methyl-o-toluamide, m-toluamide, N-methyl-m-toluamide, p-toluamide, N-methyl-ptoluamide, thiobenzamide, 4-pyridinethioamide, ethionamide, pyrazine-2-thiocarboxamide, nicotinamide, stearamide, 2,2-diethoxyacetamide and lauric acid amide, amides derived from primary or secondary amines, and combinations thereof. Element 5: wherein said primary or secondary amine is selected from the group consisting of ethanolamine, diethanolamine, partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine, tert-benzyl-tert-butylamine, 3,4-diaminofuran, 2,4-diamino-6-phenyl-1,3,5-triazine, 2,4-diamino-6-methyl-1,3,5-triazine, 2,4 diamino-6-hydroxy-1,3,5-triazine, 2,4-diamino-6-chloro-1,3,5-triazine, 2,5-diaminotoluene, 2,6-diamino pyridine, 2,6 diaminotoluene, 2,4-diaminotoluene, m-phenylenediamine, p-phenylenediamine, 4-methyl-m-phenylenediamine, 2,5 diaminotoluene sulfate, 2-methyl-1,3-benzenediamine, 5-chloro-1,3-phenylenediamine, 2,4,6-trimethyl-1,3-benzenediamine, 3,5-di aminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenZenesulfonic acid, 4-ethoxy-1,3-phenylenediamine 2HCl, 2,4-bis(butylamino)-3-oxo-1-cyclobutenylium-1-olate, 2,4-bis(3-benzamidopropylamino) 3-oxo-1-cyclobutenylium-1-olate, 4-imino-5-methyl-2 nitramino-4H-imidazole, 2,5-diacetamido-1,3,4-thiadiazole, 5-amino-1,3,3-trimethylcyclohexanemethylamine and combinations thereof. Element 6: wherein the quaternary nitrogen containing compound comprises quaternized amino or amide containing compounds of molecular weight less than 1500 g/mol. Element 7: wherein the quaternary nitrogen containing compound is at least one with the following general structure:

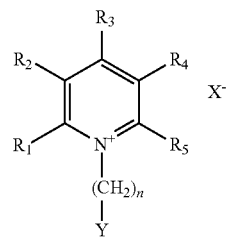

wherein: (i) n is an integer from 1 to 4; (ii) $R_1$, $R_2$, $R_3$, $R_4$, and $R_5$ are each independently selected from H, —$(CO_2H)_w$, —$(CO_2R_6)_x$, —$(C(=O)NR_7R_8)_w$, —$C(=O)NR_7R_8$, —$N(H)C(=O)R_8$, tetrazolyl, substituted tetrazolyl, alkoxy, dialkoxy, alkyl, substituted alkyl, dialkyl, substituted dialkyl, amine, substituted amine, and combinations thereof, wherein $R_6$ is a $C_1$-$C_8$ alkyl or phenyl, $R_7$ is H or a $C_1$-$C_4$ alkyl, $R_8$ is H or a $C_1$-$C_4$ alkyl, W is 1 or 2, and X is 1 or 2; (iii) Y is selected from napthyl, benzyl, anthracyl, phenanthrinyl, substituted napthyl, substituted benzyl, substituted anthracyl, substituted phenanthrinyl, and combinations thereof; and (iv) $X^-$ is a counterion with a charge sufficient to balance the positive charge on the parent compound of the general structure; and wherein the composition retains dispersibility in an acidic environment. Element 8: wherein the product of the reaction between at least one aldehyde and at least one amide comprises a compound with at least one the following structures:

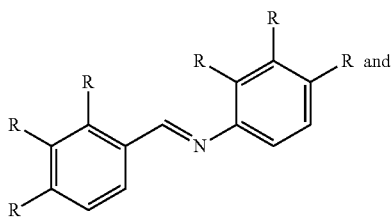

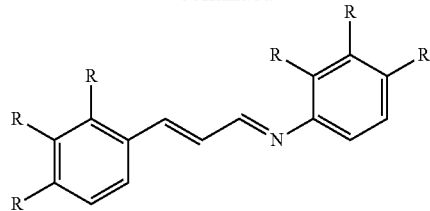

where R is H, methyl, ethyl, hydroxy, methoxy, ethoxy, bromo, chloro, fluoro, mercapto, dimethylamino, diethylamino groups, N-alkyl, N-cycloalkyl and N-alkylarylpyridinium halides, N-cyclohexylpyridinium bromide or chloride, N-alkyl, N-cycloalkyl, N-alkylarylquinolinium halides, N-dodecylquinolinium bromide or chloride, and combinations thereof. Element 9: wherein the metal surface comprises a composition selected from the group consisting of carbon-steel containing manganese or chromium in amount greater than about 0.7 wt %, N-80, L-80, J-55, P-110, C-95, QT800, QT-900, QT-1000, 5LX-series, HS80, HS-90; corrosion resistant alloys (CRA) containing stainless steel and variable chromium content ranging from about 1 to about 40 wt %, autenitic CRAs, superaustenitic CRAs, nitrogen and nickel containing CRAs, ferritic CRAs, duplex and martensitic CRAs, 13Cr-L80, 13Cr-L110, 25Cr alloy, Incoloy 825, 316L, and mixtures thereof. Element 10: wherein the aqueous acid solution further comprises at least one of formic acid, acetic acid, citric acid, glycolic acid, hydroxyacetic acid, lactic acid, maleic acid, hydrofluoric acid, 3-hydroxypropionic acid, carbonic acid, glutamic acid N,N-diacetic acid or a salt thereof (GLDA), hydroxyimino disuccinic acid (HIDS) and/or methylglycine N,N-diacetic acid or a salt thereof (MGDA), β-alanine diacetic acid, ethylenediaminedisuccinic acid, iminodisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-)1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof. Element 11: wherein the temperature of the metal surface is in the range of about 150° F. to about 300° F. Element 12: wherein the temperature is at least about 215° F. Element 13: further comprising at least one of potassium iodide, sodium iodide, and combinations thereof. Element 14: wherein the corrosion inhibitor composition further comprises at least one of ethylene glycol, diethylene glycol, propylene glycol, surfactants, and combinations thereof. Element 15: wherein the surfactants are selected from the group consisting of linear alcohol ethoxylates, amine alcohol ethoxylates, ethoxylated amides, ethoxylated alkyl amines, alkylphenol, alkyoxylated fatty acids, and combinations thereof.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A corrosion inhibitor composition comprising:
an organic solvent comprising tetrahydrofurfuryl alcohol;
a nitrogen containing compound, wherein the nitrogen containing compound includes at least one of:
the product of a reaction between at least one aldehyde and at least one amide that is not formamide or a formamide derivative;
a quaternary nitrogen containing compound; and combinations thereof, and
an aqueous acid solution comprising HCl.

2. The composition of claim 1, wherein the organic solvent is present in an amount of about 5% to about 100% by weight of the aqueous acid solution.

3. The composition of claim 1, wherein the at least one aldehyde comprises at least one aldehyde selected from the group consisting of 2-hydroxynapthaldehyde, 7-phenyl-2,4,6-heptatrienal, crotonaldehyde, 2-hexenal, 2-heptenal, 2-octenal; 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2 methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, 3,7-dimethyl-2,6-octadienal, cinnamaloxime, cinnamonitrile, and beta-hydroxy aldehydes which dehydrate to form alpha,beta-unsaturated aldehydes under acidic conditions, glyoxylic acid, glyoxal, and combinations thereof.

4. The composition of claim 1, wherein the at least one amide comprises at least one amide selected from the group consisting of acetamide, N-methylacetamide, trichloroacetamide, N-methyltrichloroacetamide, propanamide, N-methylpropanamide, butanamide, N-methylbutanamide, pentanamide, N-methylpentanamide, hexanamide, N-methylhexanamide, benzamide, N-methylbenzamide, 1-naphthylamide, N-methyl-1-naphthylamide, 2-naphthylamide, N-methyl-2-naphthylamide, o-toluamide, N-methyl-o-toluamide, m-toluamide, N-methyl-m-toluamide, p-toluamide, N-methyl-ptoluamide, thiobenzamide, 4-pyridinethioamide, ethionamide, pyrazine-2-thiocarboxamide, nicotinamide, stearamide, 2,2-diethoxyacetamide and lauric acid amide, amides derived from primary or secondary amines, and combinations thereof.

5. The composition of claim 4, wherein said primary or secondary amine is selected from the group consisting of ethanolamine, diethanolamine, partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine, tert-benzyl-tert-butylamine, 3,4-diaminofuran, 2,4-diamino-6-phenyl-1,3,5-triazine, 2,4-diamino-6-methyl-1,3,5-triazine, 2,4 diamino-6,-hydroxy-1,3, 5-triazine, 2,4-diamino-6-chloro-1,3,5-triazine, 2,5-diaminotoluene, 2,6-diamino pyridine, 2,6 diaminotoluene, 2,4-diaminotoluene, m-phenylenediamine, p-phenylenediamine, 4-methyl-m-phenylenediamine, 2,5 diaminotoluene sulfate, 2-methyl-1,3-benzenediamine, 5-chloro-1,3-phenylenediamine, 2,4,6-trimethyl-1,3-benzenediamine, 3,5-diaminobenzoic acid, 3-nitro-1,2-benzenediamine, 2-nitro-1,2-benzenediamine, 1,3-benzenediamine, 4-nitro-1,2-benzenediamine, 3-nitro-1,3-phenylenediamine, 2',4'-diaminoacetanilide, N-(3-aminophenyl)butanamide, 2,4-diaminobenZenesulfonic acid, 4-ethoxy-1,3-phenylenediamine 2HCl, 2,4-bis(butylamino)-3-oxo-1-cyclobutenylium-1-olate, 2,4-bis(3-benzamidopropylamino) 3-oxo-1-cyclobutenylium-1-olate, 4-imino-5-methyl-2 nitramino-4H-imidazole, 2,5-diacetamido-1,3,4-thiadiazole, 5-amino-1,3,3-trimethylcyclohexanemethylamine and combinations thereof.

6. The composition of claim 1, wherein the quaternary nitrogen containing compound comprises quaternized amino or amide containing compounds of molecular weight less than 1500 g/mol.

7. The composition of claim 1, wherein the product of the reaction between at least one aldehyde and at least one amide comprises a compound with at least one the following structures:

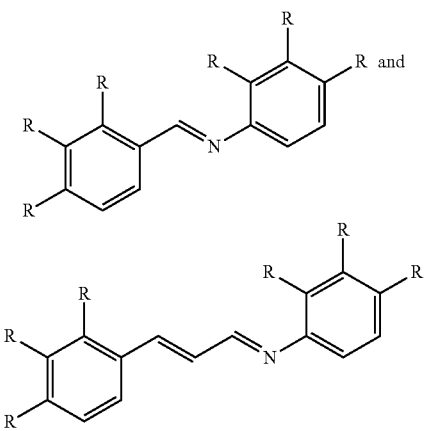

where R is H, methyl, ethyl, hydroxy, methoxy, ethoxy, bromo, chloro, fluoro, mercapto, dimethylamino, diethylamino groups, N-alkyl, N-cycloalkyl and N-alkylarylpyridinium halides, N-cyclohexylpyridinium bromide or chloride, N-alkyl, N-cycloalkyl, N-alkylarylquinolinium halides, N-dodecylquinolinium bromide or chloride, and combinations thereof.

8. The composition of claim 1, wherein the aqueous acid solution further comprises at least one of formic acid, acetic acid, citric acid, glycolic acid, hydroxyacetic acid, lactic acid, maleic acid, hydrofluoric acid, 3-hydroxypropionic acid, carbonic acid, glutamic acid N,N-diacetic acid or a salt thereof (GLDA), hydroxyimino disuccinic acid (HIDS) and/or methylglycine N,N-diacetic acid or a salt thereof (MGDA), β-alanine diacetic acid, ethylenediaminedisuccinic acid, iminodisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof.

9. The composition of claim 1, further comprising at least one of potassium iodide, sodium iodide, and combinations thereof.

10. The composition of claim 1, further comprising at least one of ethylene glycol, diethylene glycol, propylene glycol, surfactants, and combinations thereof.

11. The composition of claim 10, wherein the surfactants are selected from the group consisting of linear alcohol ethoxylates, amine alcohol ethoxylates, ethoxylated amides, ethoxylated alkyl amines, alkylphenol, alkyoxylated fatty acids, and combinations thereof.

\* \* \* \* \*